(12) United States Patent
Kuwayama et al.

(10) Patent No.: US 8,490,603 B2
(45) Date of Patent: Jul. 23, 2013

(54) FUEL TANK VALVE DEVICE AND FUEL TANK VENTILATION DEVICE

(75) Inventors: Kenta Kuwayama, Kiyosu (JP);
Natsushi Miura, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 207 days.

(21) Appl. No.: 13/178,888

(22) Filed: Jul. 8, 2011

(65) Prior Publication Data
US 2012/0024853 A1 Feb. 2, 2012

(30) Foreign Application Priority Data

Jul. 30, 2010 (JP) .................................. 2010-171250
May 18, 2011 (JP) .................................. 2011-110906

(51) Int. Cl.
*F02M 33/02* (2006.01)
(52) U.S. Cl.
USPC ........................................ 123/518; 137/512.2
(58) Field of Classification Search
USPC .................... 123/518, 519; 137/512.2, 512.3, 137/202, 43, 583, 587
See application file for complete search history.

(56) References Cited

U.S. PATENT DOCUMENTS

| 4,991,615 A | * | 2/1991 | Szlaga et al. | 137/43 |
| 5,762,090 A | * | 6/1998 | Halamish et al. | 137/43 |
| 6,810,900 B2 | * | 11/2004 | Kato | 137/202 |
| 6,951,209 B2 | | 10/2005 | Yanase et al. | |
| 2008/0041347 A1 | * | 2/2008 | Mills | 123/518 |

* cited by examiner

*Primary Examiner* — John Rivell
*Assistant Examiner* — Ian Paquette
(74) *Attorney, Agent, or Firm* — Posz Law Group, PLC

(57) ABSTRACT

A fuel tank valve device equipped with a casing, and a valve mechanism. The valve mechanism has a first valve unit having a first valve connecting hole, and a second valve unit that opens and closes the first valve connecting hole. The first valve unit completely closes the valve flow path by moving by the force in the valve closing direction when the pressure of the second communication path exceeds a preset first pressure value. In a state when the first valve unit is closing the valve flow path, when the pressure of the second communication path exceeds a preset second pressure value that is greater than the first pressure value, the second valve unit receives the pressure from the first valve connecting hole and moves to open the first valve connecting hole, communicating with the valve flow path.

20 Claims, 14 Drawing Sheets

FUEL TANK VALVE DEVICE AND FUEL TANK VENTILATION DEVICE

This application claims the benefit of and priority from Japanese Application No. 2010-171250 filed Sep. 30, 2010 and No. 2011-110906 filed May 18, 2011, the contents of which are incorporated herein by reference.

BACKGROUND OF THE INVENTION

1. Field of the Invention

The present invention relates to a fuel tank valve device for adjusting the internal tank pressure of a fuel tank and a fuel tank ventilation device.

2. Description of the Related Art

A fuel tank ventilation device using this type of fuel tank valve device is disclosed in Japanese Patent No. 4035022. Specifically, the A fuel tank ventilation device is equipped with a full tank control valve and a rollover valve mounted on the top part of the fuel tank, a canister connected via an external path to the full tank control valve and rollover valve, and a check valve provided on the external path connected to the rollover valve. The full tank control valve closes after fulfill fuel, and the rollover valve ensures ventilation to the outside by a float rising and falling according to the fuel fluid level within the fuel tank and also prevents outflow of fuel from the fuel tank when the vehicle is tilted and the like. Also, the check valve prevents the tank internal pressure from going to a preset value or greater and also prevents overfilling during fueling by opening at two stages when the internal pressure of the fuel tank rises.

However, with the fuel tank ventilation device, there was the problem that it is not possible to sufficiently prevent overfilling during fueling.

SUMMARY

An advantage of some aspects of the invention is to provide a fuel tank valve device that makes auto-stop function during fueling, that also can reliably prevent overfilling, and that further can prevent leaking out of fuel from the fueling port after auto-stop, as well as a fuel tank ventilation device that uses this.

According to an aspect of the invention, there is to a fuel tank valve device that communicates and shuts off a path between an interior of a fuel tank and outside, the fuel tank valve device comprises: a casing that includes a first communication path connected to the outside, a second communication path connected to the fuel tank, and a valve chamber that forms a valve flow path that connects the first communication path and the second communication path, and a valve mechanism that is held in the valve chamber, and opens and closes the valve flow path according to pressure of the first communication path and the second communication path. The valve mechanism includes a first valve unit that has a pressure receiving surface that receives pressure from the first and second communication path, wherein an area of the pressure receiving surface is larger than a close sectional area of the first communication path, and a first valve connecting hole that forms a part of the valve flow path, and a second valve unit that opens and closes the first valve connecting hole. The first valve unit is configured to close the valve flow path when the pressure of the second communication path exceeds a preset first pressure value, and the second valve unit is configured to open the first valve connecting hole when the first valve unit closes the valve flow path, and the pressure of the second communication path exceeds a preset second pressure value that is greater than the first pressure value, thereby the valve flow path being opened through the first valve connecting hole.

With a fuel tank using the fuel tank valve device of application example 1, when fueling is done into a fuel tank through an inlet pipe from a fueling gun, by the valve closing operation of the fuel cutoff valve or the like, the tank internal pressure rises, and along with this, the fuel fluid level within the inlet pipe rises, and the fueling gun auto-stop function operates. The risen tank internal pressure is applied to the pressure receiving surface of the first valve unit through the second communication path of the fuel tank valve device, and when the first pressure value is exceeded, the valve flow path is completely closed by moving the first valve unit. By doing this, the tank internal pressure is maintained by the fuel tank valve device without escaping to the outside, so the fuel fluid level within the inlet pipe is held, and overfilling is prevented. At this time, when the tank internal pressure exceeds a preset second pressure value, the second valve unit opens the valve flow path, and by opening the first valve connecting hole, the tank internal pressure is allowed to escape to the outside. Therefore, the fuel tank valve device gradually reduces the tank internal pressure during fueling, and is able to maintain it at a second pressure value which prevents overfilling, without becoming too large.

The fuel tank valve device can realize a simple overfilling prevention mechanism simply with a valve opening pressure setting with which the first valve unit and second valve unit receive the tank internal pressure.

The fuel tank valve device can be arranged on the connection tube to the outside of the rollover valve, canister or the like, and compared to when providing an overfill prevention mechanism by improving the constitution of a fuel cutoff valve or the like, the fuel tank system does not have a complex constitution.

With application example 2, can have a constitution for which the first valve unit comprises: a valve part and a cup shaped support part, wherein the valve part includes a seat surface that opens and closes the valve flow path by seating on an opening peripheral edge part of the first communication path, and a second valve connecting hole that pierces through the seat surface and is connected to the first communication path, and the support part is mounted on the valve part to form a storage chamber together with the valve part, and includes a bottom wall that has the first valve connecting hole and a side wall provided projecting in a cylinder shape from an outer periphery of the bottom wall, and the second valve unit is held in the storage chamber to open and close the first valve connecting hole, and is configured such that the valve flow path includes a first flow path that is formed between the first valve unit and an inner wall of the casing, and is opened and closed by the seat surface, and a second valve flow path that is formed together the first valve connecting hole, the storage chamber, and the second valve connecting hole, and is opened and closed by the second valve unit.

The casing of application example 3 can have a constitution equipped with guide projections that guide the movement of the first valve unit along an inner wall forming the valve chamber, and form a part of the first valve flow path.

The first valve unit of application example 4 can have a constitution with ribs that form a part of the second valve flow path by projecting from an inner wall forming the storage chamber.

With application example 5, the second valve unit is a ball valve, and the bottom wall of the support part comprises a slanted surface, wherein the slanted surface is formed such that the second valve unit is supported to move toward the first valve connecting hole by gravity thereof. With this constitution, when fueling ends and the vehicle is running, the second valve unit which is a ball valve moves the slanted surface, the first valve connecting hole opens, the tank internal pressure escapes, and the fuel tank valve device opens the valve, so ventilation from the fuel tank interior to the outside is ensured.

With application example 6, the second valve unit is slidably held in the storage chamber, and includes a bottom wall and a side wall projecting in a cylinder shape from an outer periphery of the bottom wall, wherein the bottom wall and the side wall form a cup-shaped storage part, and the bottom wall of the second valve unit includes a valve part that opens and closes the first valve connecting hole. With this constitution, the second valve unit is formed in a cup shape, and the valve part formed on its bottom wall sits on the opening peripheral edge part of the first valve connecting hole, so compared to application example 5, the angle dependence of the fuel tank valve device is low. Also, the first valve connecting hole can be set to have a larger area than the second valve unit using a ball valve of application example 5. Thus, it is possible to flow a large air flow volume, and it is possible to suppress a rapid rise in the tank internal pressure.

With application example 7, the side wall of the second valve unit has ribs that form a part of the second valve flow path by projecting from an wall surface forming the storage part.

With application example 8, the valve mechanism comprises a third valve unit that has a ball valve held in the storage part, and the bottom wall of the second valve unit comprises a third valve connecting hole that connects the first valve connecting hole and the storage part, and a slanted surface to be formed such that the third valve unit is supported to move toward the third valve connecting hole by gravity thereof.

With application example 9, it further comprises a shielding member that is disposed between the second communication path and the first valve connecting hole, for forming a detour, wherein the detour is configured such that the fluid flowing from the second communication path to the first valve connecting hole flows to avoid direct contact with the second valve unit.

A fuel tank ventilation device can comprise the fuel tank valve device of claim 6, and a first and second fuel cutoff valves. The first fuel cutoff valve includes; a first casing that has a first connecting path connected to outside of the fuel tank, and a first valve chamber for connecting the first connecting path and the fuel tank interior, and a first float mechanism that is held in the first valve chamber and closes the first connecting path by rising when the fuel fluid level of the fuel tank exceeds a first fluid level. The second fuel cutoff valve includes; a second casing that has a second connecting path connected to the second communication path of the fuel tank valve device, and a second valve chamber for connecting the second connecting path and the fuel tank interior, wherein a close sectional area of the second connecting path is smaller than that of the first connecting path, and a second float mechanism that is held in the second valve chamber and closes the second connecting path by rising when the fuel fluid level of the fluid tank exceeds a second fluid level higher than the first fluid level.

With application example 11, it is possible to have a constitution for which the first casing of the first fuel cutoff valve and the casing of the fuel tank valve device are assembled as an integral unit.

With application example 12, it is possible to have a constitution for which the second casing of the second fuel cutoff valve and the casing of the fuel tank valve device are assembled as an integral unit.

These and other objects, features, aspects, and advantages of the present invention will become more apparent from the following detailed description of the preferred embodiments with the accompanying drawings.

DESCRIPTION OF THE PREFERRED EMBODIMENTS

A. First Embodiment
(1) Schematic Structure of Fuel Tank Ventilation Device FS

Figure 1:
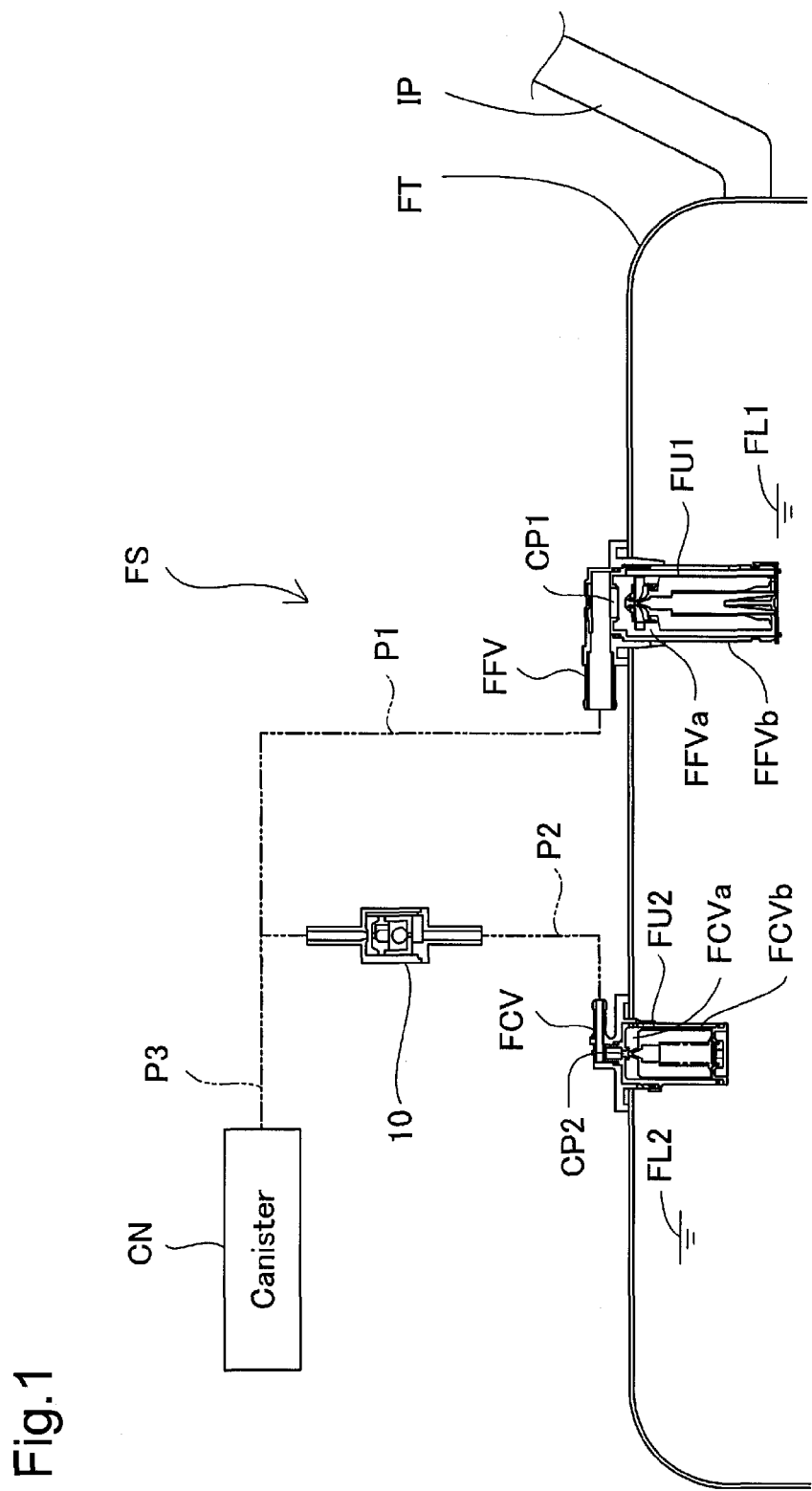
FIG. 1 shows the fuel tank ventilation device in which the fuel tank valve device of the first embodiment of the present invention is mounted.

FIG. 1 shows a fuel tank ventilation device in which the fuel tank valve device of the first embodiment of the present invention is mounted. The fuel tank ventilation device FS is equipped with a so-called out tank type full tank control valve FFV (first fuel cutoff valve) and rollover valve FCV (second fuel cutoff valve) attached to the upper wall inside a flat type fuel tank FT, a fuel tank valve device 10 arranged outside the fuel tank FT, a canister CN, and connection piping that connects these. The full tank control valve FFV is equipped with a first casing FFVb that forms a first valve chamber FFVa that connects a first connecting path CP1 and the fuel tank FT interior, and a first float mechanism FU1 held in the first valve chamber FFVa, and when the fuel fluid level within the fuel tank FT reaches a first fluid level FL1 during fueling, this is a valve that raises the first float mechanism FU1 and then closes the first connecting path CP1.

The rollover valve FCV is a valve that is arranged to ensure ventilation to the outside even when the vehicle is tilted, is equipped with a second connecting path CP2 for which the path area (close sectional area) is smaller than that of the first connecting path CP1 of the full tank control valve FFV, a second casing FCVb that forms a second valve chamber FCVa that connects the second connecting path CP2 and the fuel tank FT interior, and a second float mechanism FU2 held in the second valve chamber FCVa, and that closes the second connecting path CP2 by rising when the fuel fluid level of the fuel tank FT exceeds a second fluid level FL2 which is higher than the first fluid level FL1.

These valves ensure ventilation to outside the fuel tank FT and also prevent the outflow of fuel. The full tank control valve FFV is connected to the canister CN via a first piping P1. The fuel tank valve device 10 is connected to the rollover valve FCV through a second piping P2, is further connected to the canister CN through a third piping P3, and during fueling, has the auto-stop function and the function of preventing overfill.

(2) Constitution and Operation of Fuel Tank Valve Device 10

Figure 2:
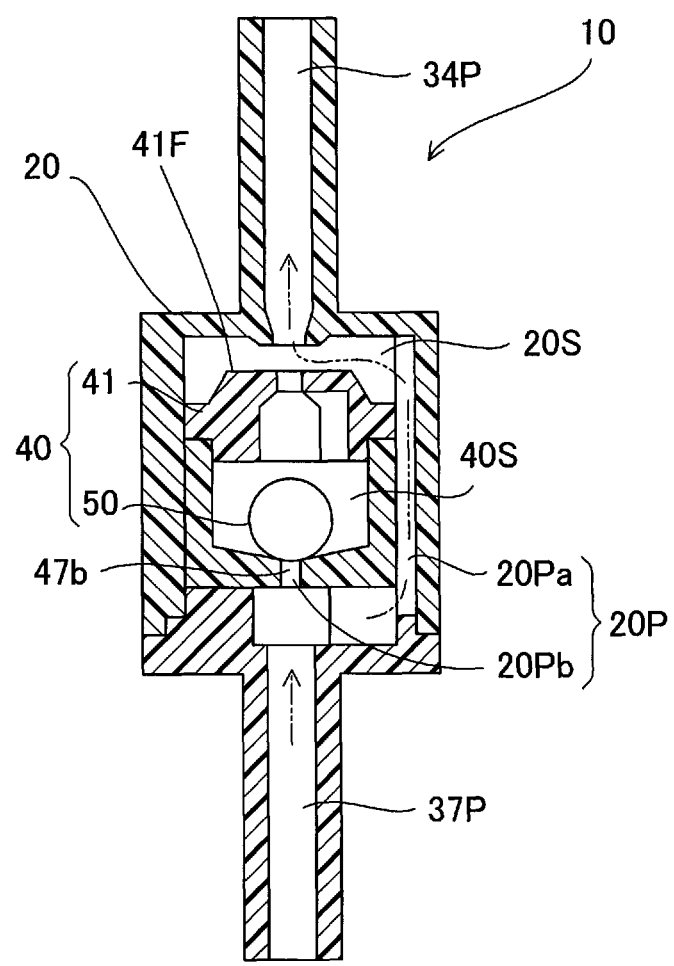
FIG. 2 is a cross section view showing the fuel tank valve device.

FIG. 2 is cross section view showing the fuel tank valve device 10. The fuel tank valve device 10 is equipped with a casing 20 that forms a valve chamber 20S, and a valve mechanism 40 held inside the valve chamber 20S. The valve mechanism 40 is equipped with a first valve unit 41 and a second valve unit 50 that open and close a valve flow path 20P formed in the valve chamber 20S, and opens and closes the pass according to the pressure received by the first valve unit 41 and the second valve unit 50.

(2)-1 Constitution of Casing 20

Figure 3:
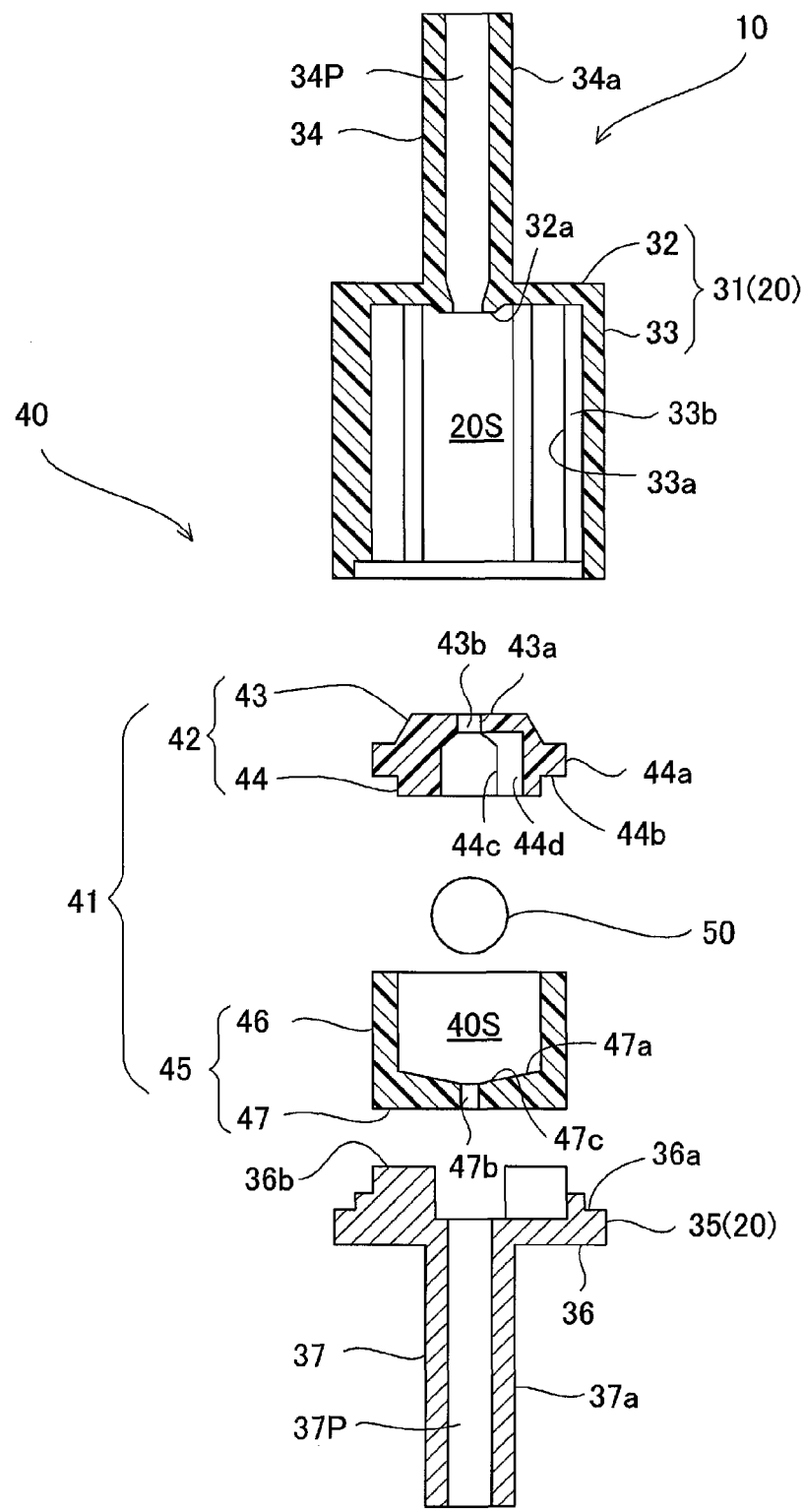
FIG. 3 is an exploded cross section view of a fuel tank valve device.
Figure 4:
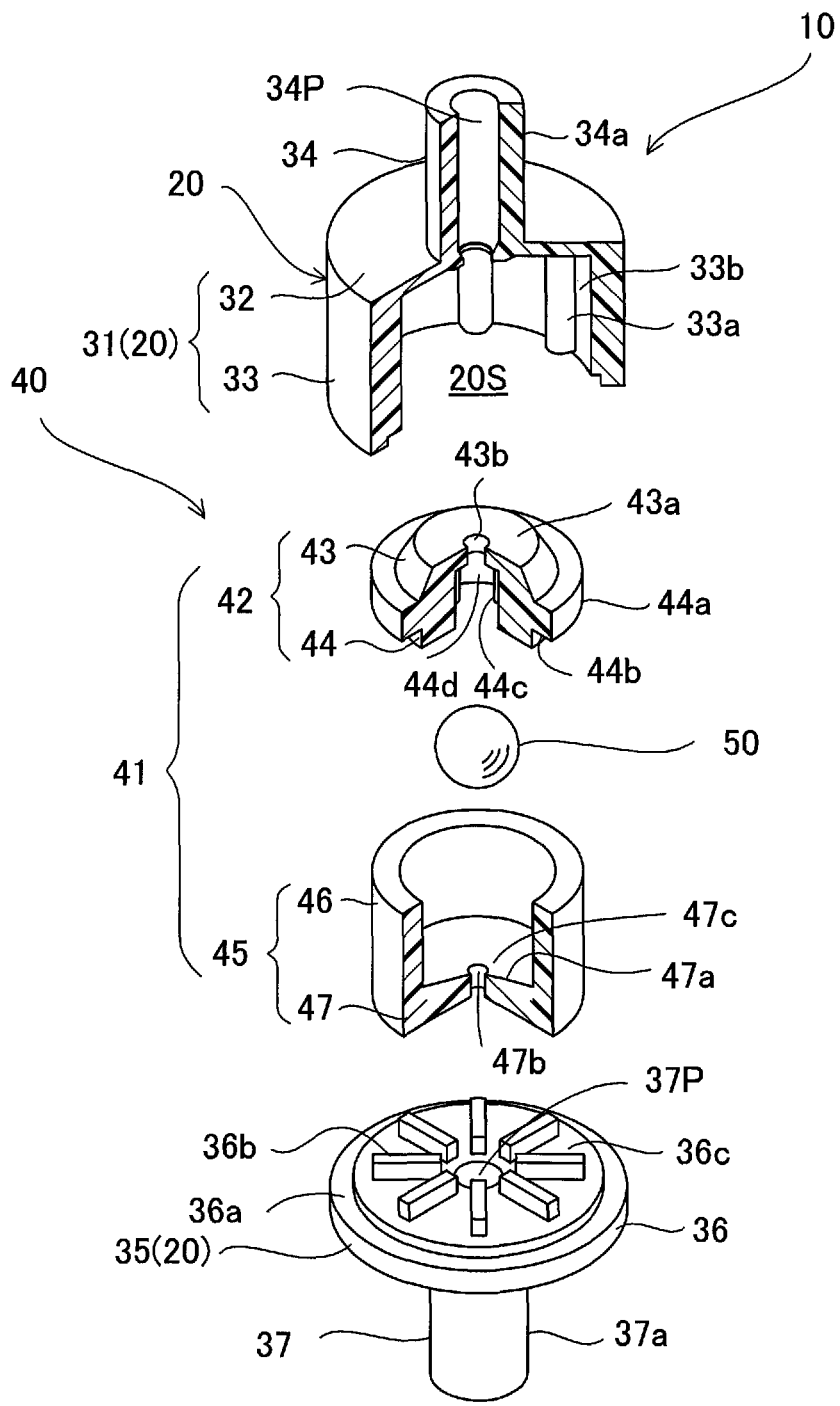
FIG. 4 is an exploded perspective view of the fuel tank valve device with one portion fractured.

FIG. 3 is an exploded cross section view of the fuel tank valve device 10, and FIG. 4 is an exploded perspective view of the fuel tank valve device 10. The casing 20 is equipped with a first valve chamber forming member 31 and a second valve chamber forming member 35, and these form a valve chamber 20S. The first valve chamber forming member 31 is equipped with a disk shaped upper wall 32, a cylinder part 33 projecting downward from the outer periphery of the upper wall 32, and a first connecting pipe part 34 having a first communication path 34P projecting upward from the center part of the upper wall 32. A seal part 32a projecting toward the valve chamber 20S side is formed on the upper wall 32. The seal part 32a is arranged facing the first communication path 34P. A plurality (8 locations in the drawing) of guide projections 33a are formed in a rib shape in the axial direction on the inner wall of the cylinder part 33, and spaces between these guide projections 33a form the side part paths 33b. The first connecting tube part 34 is connected to the canister CN via the third piping P3 shown in FIG. 1. Note that it is also possible to connect in a state with the retaining force to the third piping P3 heightened by forming a circular projecting part or the like on the first connecting part 34a.

The second valve chamber forming member 35 is equipped with a disk shaped path wall 36 that closes the opening of the valve chamber 20S, and a second connecting tube part 37 for which the second communication path 37P is formed projecting downward from the path wall 36. The outer periphery of the path wall 36 is a joint step part 36a, and is joined by welding at the bottom edge of the cylinder part 33. Also, the top surface of the path wall 36 has support projections 36b provided projecting in a radiating form, have the valve mechanism 40 placed on these, and also have paths formed between the support projections 36b. The second connecting tube part 37 is connected to the rollover valve FCV via the second piping P2 shown in FIG. 1. At the outer periphery of the second connecting tube part 37 is a second connecting part 37a for connecting the second piping P2. Note that it is also possible to connect in a state with higher retaining force in relation to the second piping P2 by forming a circular projection or the like at the second connecting part 37a.

(2)-2 Constitution of Valve Mechanism 40

The valve mechanism 40 is held within the valve chamber 20S and is equipped with a first valve unit 41 and a second valve unit 50. The first valve unit 41 is equipped with a valve part 42 comprising of a disk part 43 and a side wall 44, and a cup shaped support part 45 joined to the valve part 42. A seat surface 43a that attaches and detaches with the seal part 32a is formed on the top surface of the disk part 43. A second valve connecting hole 43b connected to the first communication path 34P is pierced through the center of the disk part 43. Also, a side wall 44 is formed in cylinder form at the outer periphery of the disk part 43. A flange 44a is formed at the outer periphery of the side wall 44, and the bottom part thereof is a step part 44b. Also, pluralities of ribs 44c are formed at an interval in the axial direction on the inner periphery of the side wall 44, and spaces between those are paths 44d. The support part 45 is equipped with a cylinder shaped side wall 46 and a bottom wall 47 formed on the bottom part of the side wall 46, and these are formed as an integral unit in a cup shape. The bottom wall 47 is a slanted surface 47a for which the top surface is slanted toward the center. A first valve connecting hole 47b connected to the second communication path 37P is formed on the bottom wall 47. The opening peripheral edge part of the first valve connecting hole 47b is a second seat surface 47c, and the first valve connecting hole 47b is opened and closed by attaching and detaching of the second valve unit 50. The second valve unit 50 is a steel ball valve which is placed on the slanted surface 47a, and receives force in the direction closing the first valve connecting hole 47b.

Figure 5:
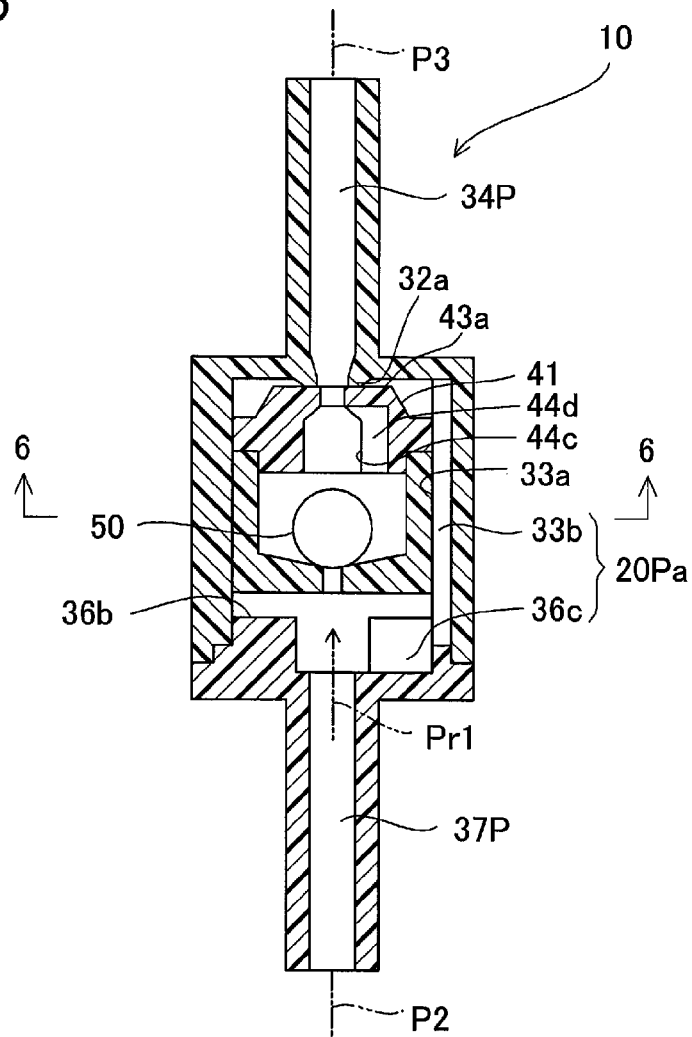
FIG. 5 shows the valve closing operation of the first valve unit.
Figure 6:
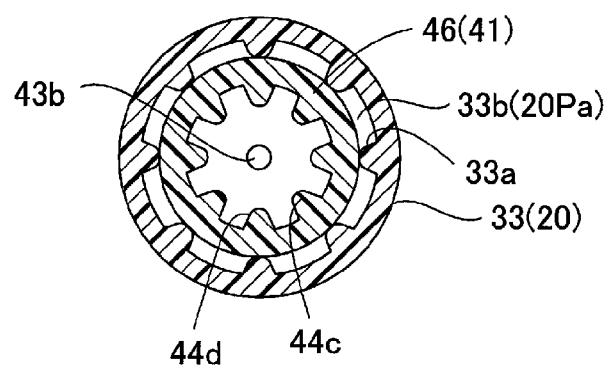
FIG. 6 is a cross section view along line 6-6 in FIG. 5.

The first valve unit 41 and the second valve unit 50 of the valve mechanism 40 respectively opens and closes the valve flow path 20P by the pressure difference of the first communication path 34P and the second communication path 37P, and by balancing with the self weight of both valve units. Here, as shown in FIG. 2, the valve flow path 20P is equipped with a first valve flow path 20Pa that is opened and closed by the first valve unit 41, and a second valve flow path 20Pb that is opened and closed by the second valve unit 50. FIG. 5 shows the valve closing operation of the first valve unit 41. FIG. 6 is a cross section view along line 6-6 in FIG. 5. The first valve flow path 20Pa is a path that reaches from the second communication path 37P to the paths 36c between the support projections 36b, and from the side part paths 33b between the guide projections 33a to the first communication path 34P. The first valve unit 41 receives pressure from the second communication path 37P at its pressure receiving surface, and when the pressure of the second communication path 37P exceeds a preset first pressure value Pr1, by moving with the force toward the closed valve direction, the constitution is such that the first valve flow path 20Pa is completely closed by the seat surface 43a seating on the seal part 32a.

Figure 7:
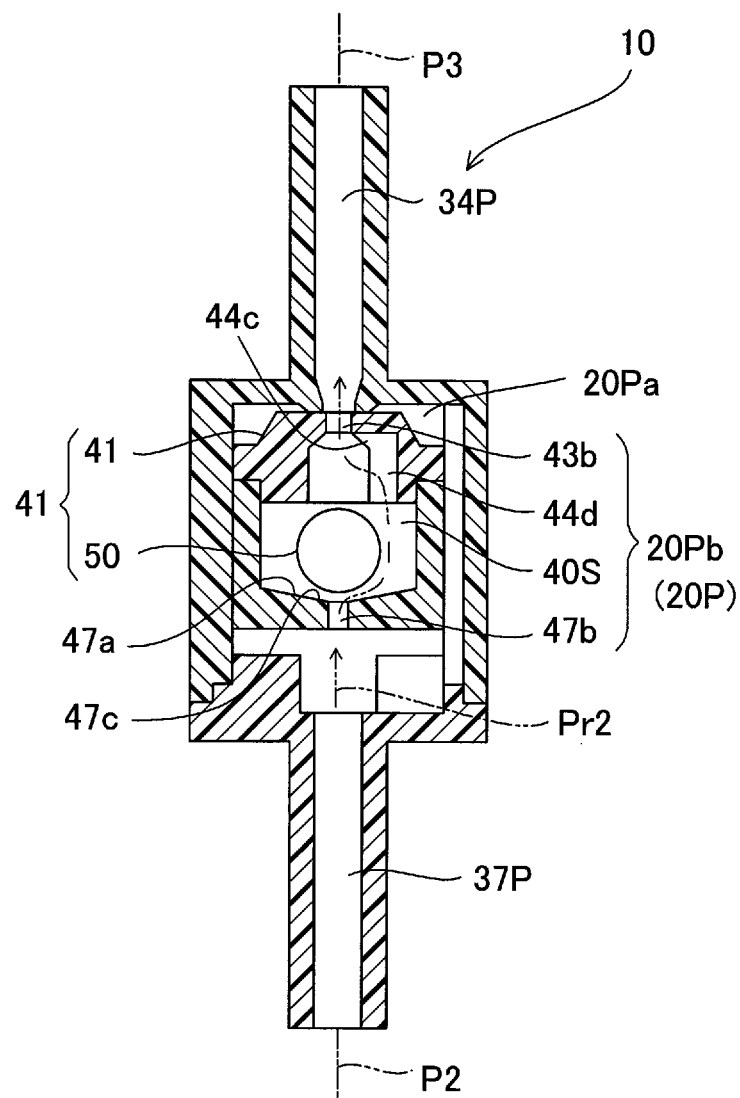
FIG. 7 shows the valve opening operation of the second valve unit.

FIG. 7 shows the valve opening operation of the second valve unit. The second valve flow path 20Pb is a path that reaches from the second communication path 37P to the first valve connecting hole 47b, the storage chamber 40S, and the paths 44d formed between the ribs 44c, and from the second valve connecting hole 43b to the first communication path 34P. The second valve unit 50 is constituted such that, in a state with the first valve unit 41 closing the first valve flow path 20Pa, the pressure of the second communication path 37P is received through the first valve connecting hole 47b, and when the pressure of the second communication path 37P exceeds the preset second pressure value Pr2, by moving it in the direction separating from the first valve connecting hole 47b, the first valve connecting hole 47b opens so as to communicate with the first valve flow path 20Pa of the valve flow path 20P.

(3) Operation of Fuel Tank Ventilation Device FS

Figure 8:
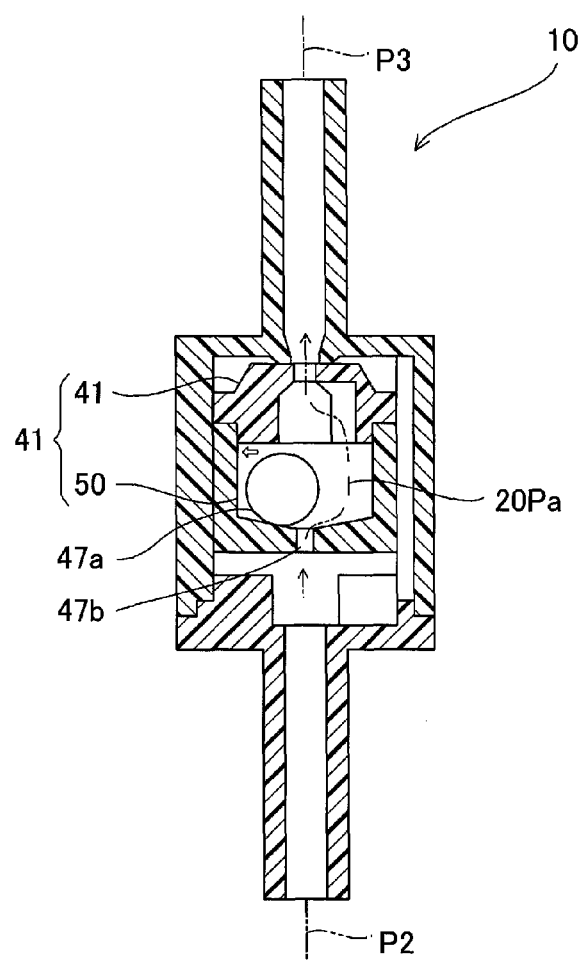
FIG. 8 shows the valve opening operation of the second valve unit.

In FIG. 1, by fueling from the fueling gun through the inlet pipe IP to inside the fuel tank FT, the fuel fluid level within the fuel tank FT reaches the first fluid level FL1 (full tank fluid level), and when the full tank control valve FFV closes, the tank internal pressure rises, and the fueling gun auto-stop function operates. At this time, the rollover valve FCV does not reach the second fluid level FL2 which is the valve closing fluid level, so the status is maintained. The risen tank internal pressure is applied to the second communication path 37P of the fuel tank valve device 10 shown in FIG. 2 and the pressure receiving surface 41F of the first valve unit 41. Then, as shown in FIG. 5, when the force toward the upward direction (valve closing direction) applied to the first valve unit 41 exceeds the self weight of the first valve unit 41 and the second valve unit 50, the first valve unit 41 moves upward, the seat surface 43a sits on the seal part 32a and the first communication path 34P is closed. By doing this, the tank internal pressure is maintained by the fuel tank valve device 10. Specifically, during fueling, after the full tank control valve FFV closes, the tank internal pressure is maintained, and the fuel fluid level within the inlet pipe IP is kept, preventing additional fueling. Then, as shown in FIG. 7, when the tank internal pressure exceeds a preset second pressure value Pr2, the second valve unit 40 separates from the second seal surface 47c, and the first valve connecting hole 47b is opened. By doing this, the tank internal pressure is allowed to escape to the canister CN through the second communication path 37P, the first valve connecting hole 47b, the storage chamber 40S, the second valve connecting hole 43b, and the first communication path 34P, suppressing a rapid rise, and it is possible to prevent blowing back from the inlet pipe IP and the like. Furthermore, when fueling ends and the vehicle is running, as shown in FIG. 8, the second valve unit 50 moves the slanted surface 47a and opens the first valve connecting hole 47b. By doing this, the tank internal pressure is allowed to escape through the first valve flow path 20Pa.

Figure 9:
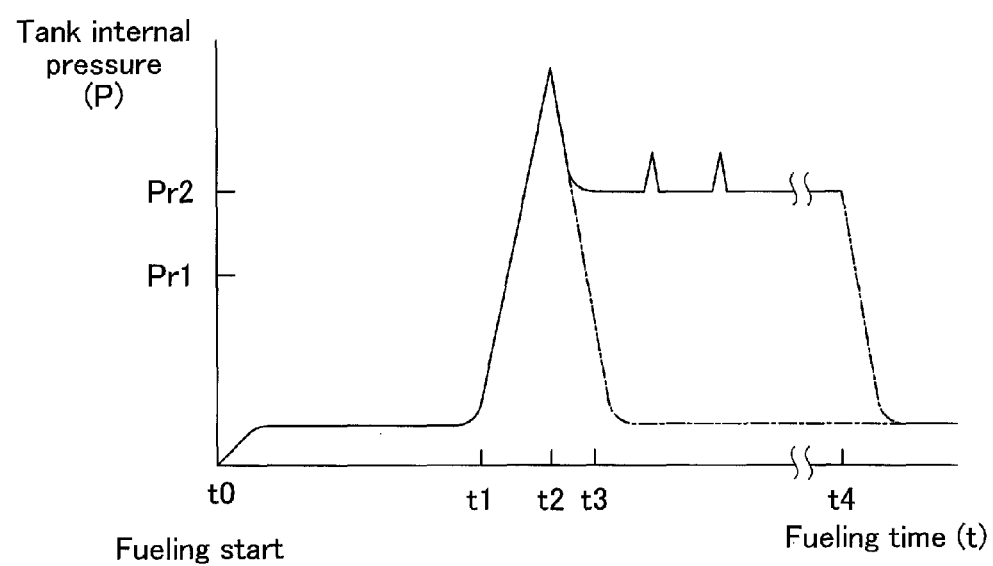
FIG. 9 shows the tank internal pressure during fueling.

FIG. 9 is an explanatory drawing that explains the tank internal pressure during fueling, and shows the tank internal pressure on the vertical axis, and the time from fueling start on the horizontal axis. In FIG. 9, from fueling start time t0, at time t1, when the fuel fluid level inside the fuel tank FT exceeds the full tank fluid level, the tank internal pressure rises by valve closing of the full tank control valve FFV, and furthermore, through the rollover valve FCV, when pressure is applied to the first valve unit 41 of the fuel tank valve device 10 and exceeds the first pressure value Pr1, the tank internal pressure rises by the first valve unit 41 closing the first valve flow path 20Pa as shown in FIG. 5. Then, when the tank internal pressure exceeds the second pressure value Pr2, as shown in FIG. 7, the second valve unit is opened (time t2 to t3), and the tank internal pressure decreases to the second pressure value Pr2. Then, from time t3 and thereafter, as shown in FIG. 5, the first valve unit 41 maintains the valve closed state, so the tank internal pressure is maintained at the second pressure value Pr2. By doing this, the tank internal pressure does not drop below the second pressure value Pr2, so the fuel fluid level inside the inlet pipe IP is kept, preventing additional fueling. Then, when fueling ends and the vehicle runs, as shown in FIG. 8, the second valve unit 50 moves the slanted surface 47a and opens the second valve flow path 20Pb (time t4). By doing this, the tank internal pressure is made to escape, and furthermore, the first valve unit 41 opens, so as shown in FIG. 1, for the fuel tank FT interior, ventilation is ensured through the rollover valve FCV and the fuel tank valve device 10.

(4) Operation and Effect of the Embodiments

The following operations and effects are exhibited by the embodiments noted above.

(4)-1 The fuel tank valve device 10 maintains the first pressure value Pr1 that operates auto-stop during fueling, so the fuel fluid level within the inlet pipe IP is kept, preventing overfilling.

(4)-2 When the tank internal pressure exceeds the second pressure value Pr2 which is greater than the first pressure value Pr1, the fuel tank valve device 10 allows the tank internal pressure to escape to the outside by the second valve unit 50 opening the valve flow path 20P and opening the first valve connecting hole 47b, so it prevents leaking out of fuel from the fueling port of the inlet pipe IP, and can also protect the fuel tank.

(4)-3 The fuel tank valve device 10 can easily realize an overfill prevention mechanism by setting the valve opening pressure at which the first valve unit 41 and the second valve unit 50 receive the tank internal pressure.

(4)-4 The fuel tank valve device 10 can be arranged at a connecting tube with the outside of the rollover valve, the canister, or the like, and compared to when providing an overfill prevention mechanism by improving the constitution of the fuel cutoff valve or the like, the fuel tank system does not become a complex constitution.

(4)-5 As shown in FIG. 5 and FIG. 7, with the fuel tank valve device 10, even if the second valve unit 50 moves in accordance with oscillation of the vehicle, the second valve unit 50 contacts the bottom edge of the rib 44c, and a ventilation path is secured by the paths 44d between the ribs 44c, so the path to the second valve connecting hole 43b is not closed, and the fuel tank interior is not tightly closed.

B. Second Embodiment

Figure 10:
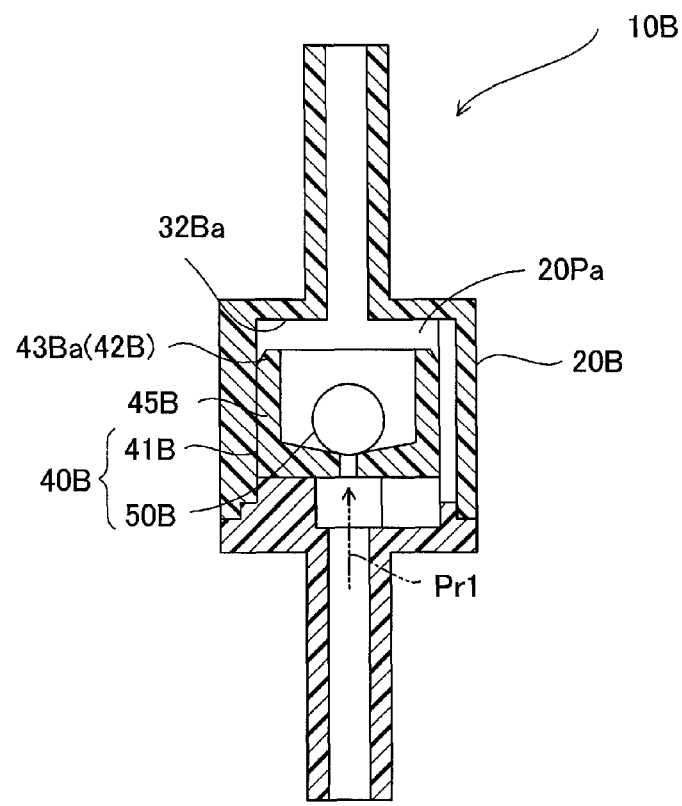
FIG. 10 is a cross section view showing the fuel tank valve device of the second embodiment.

FIG. 10 is a cross section view showing the fuel tank valve device of the second embodiment. The fuel tank valve device 10B of the second embodiment has its characteristic feature in the constitution of the first valve unit 41B of the valve mechanism 40B. Specifically, the first valve unit 41B is equipped with a valve part 42B on the top edge of the cup shaped support part 45B. A seat surface 43Ba that sits on the seal part 32Ba of the casing 20B is formed on the valve part 42B. By the valve part 42B seating on the seat surface 43Ba, the first valve unit 41B totally closes the first valve flow path 20Pa. In this way, the first valve unit 41 is not specifically limited to that constitution as long as it has a constitution that can totally close the first valve flow path 20Pa at the first pressure value Pr1.

C. Third Embodiment

Figure 11:
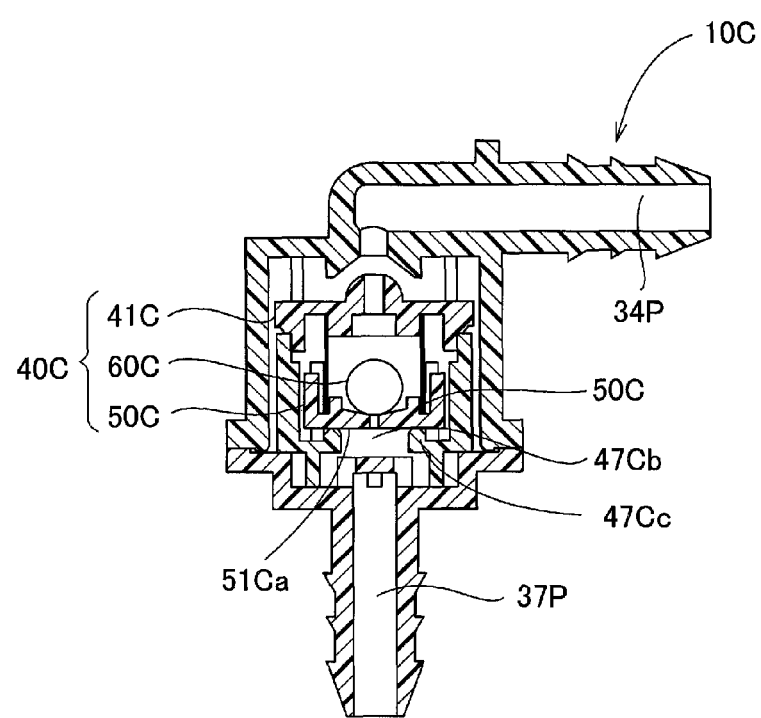
FIG. 11 is a cross section view showing the fuel tank valve device of the third embodiment.

FIG. 11 is a cross section view showing the fuel tank valve device 10C of the third embodiment. The fuel tank valve device 10C of the third embodiment has the feature of the valve mechanism 40 being constituted from three valve units. Specifically, the valve mechanism 40C is equipped with the first valve unit 41C, the second valve unit 50C, and a third valve unit 60C consisting of a steel sphere ball.

Figure 12:
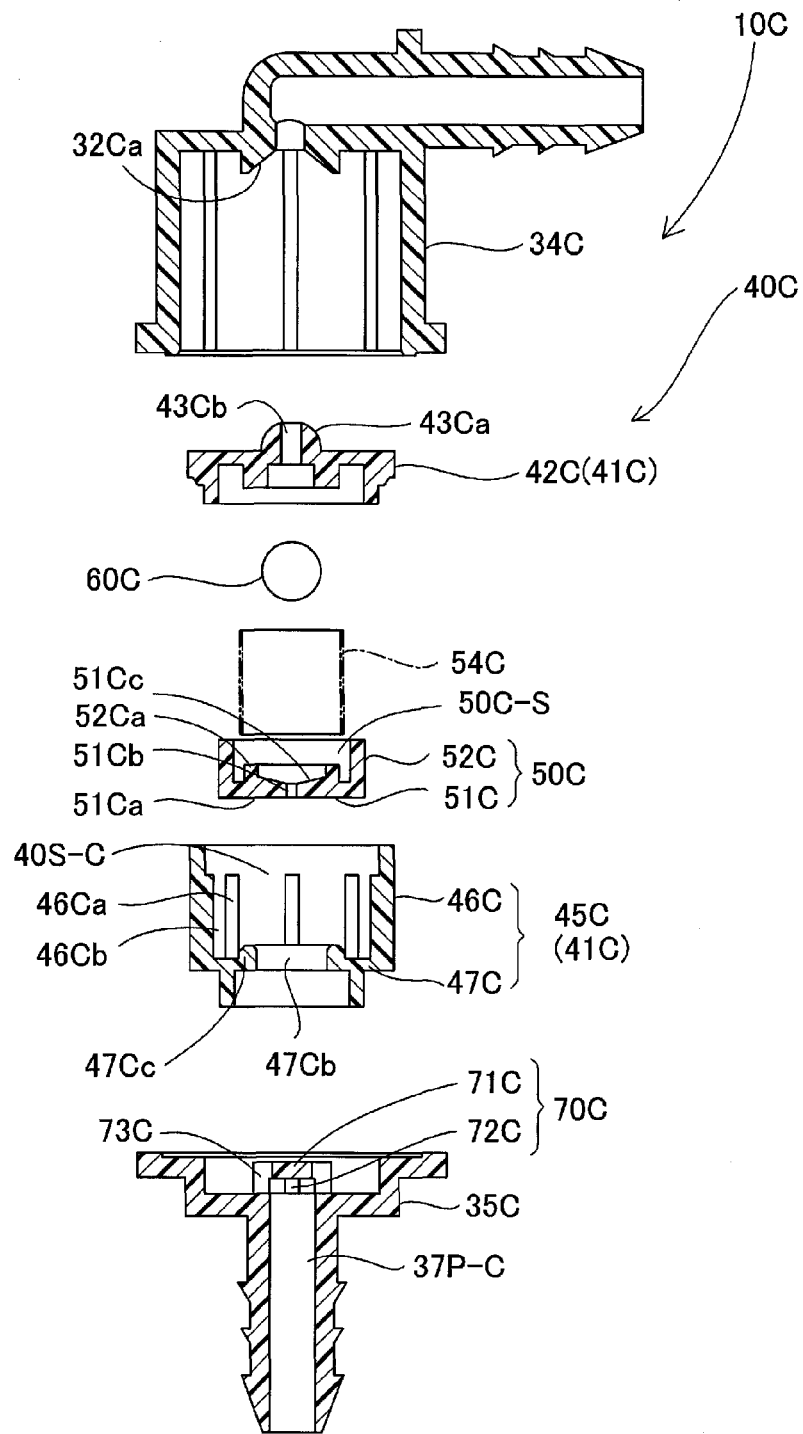
FIG. 12 is an exploded cross section view of the fuel tank valve device.
Figure 13:
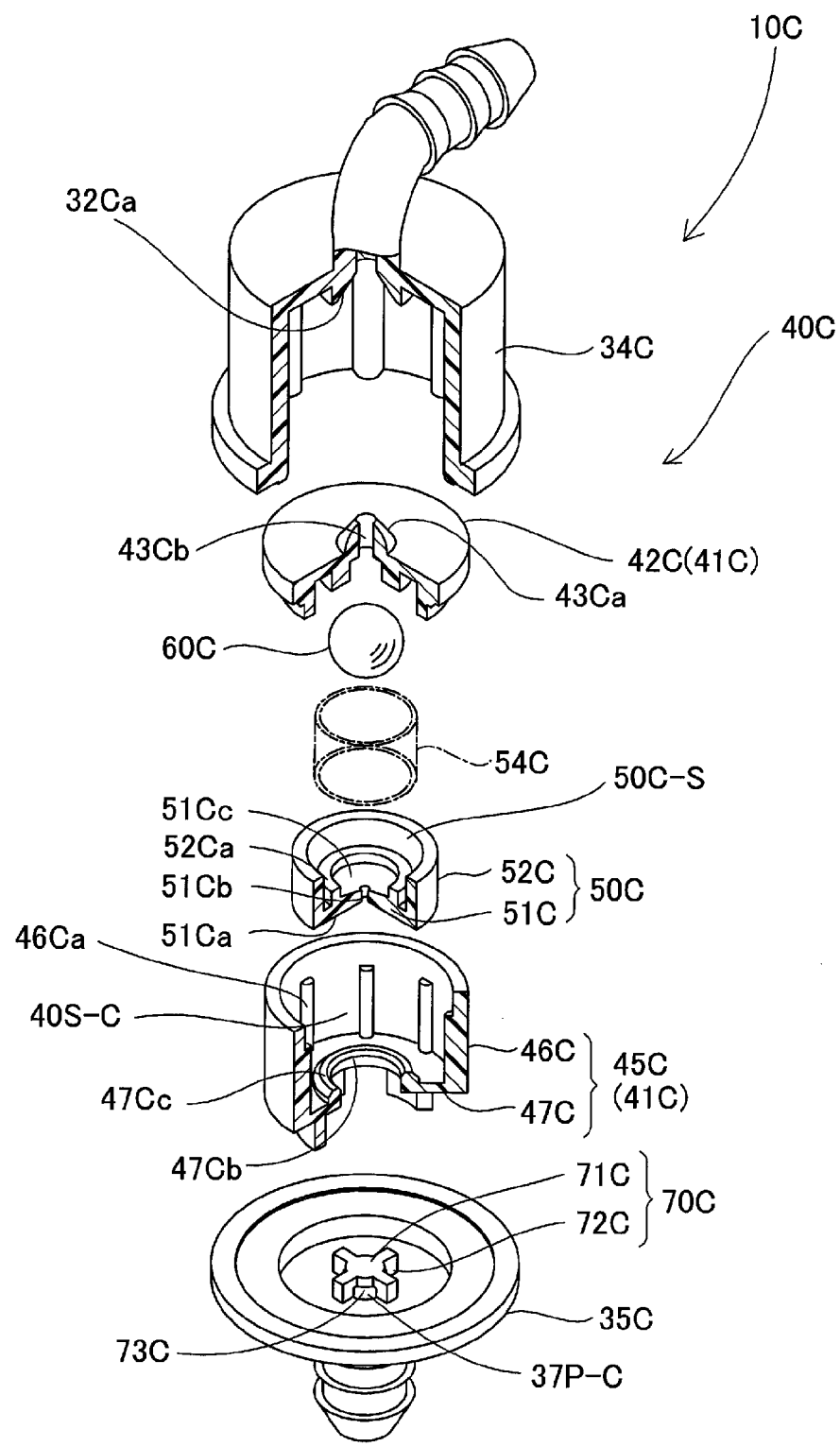
FIG. 13 is an exploded, partially fractured perspective view of the fuel tank valve device.

FIG. 12 is an exploded cross section view of the fuel tank valve device 10C. FIG. 13 is an exploded perspective view of the fuel tank valve device 10C. In FIG. 12 and FIG. 13, the first valve unit 41C is equipped with a disk shaped valve part 42C, and a cup shaped support part 45C assembled on the valve part 42C, and a storage chamber 40S-C surrounded by these is formed. A seat surface 43Ca that attaches and detaches with the seal part 32Ca and a second valve connecting hole 43Cb are formed on the valve part 42C. The support part 45C is equipped with a cylinder shaped side wall 46C and a bottom wall 47C formed on the bottom part of the side wall 46C. Ribs 46Ca are formed at a plurality of specified intervals in the axial direction on the inner wall of the side wall 46C, and between those are paths 46Cb. The first valve connecting hole 47Cb that is connected to the second communication path 37P-C is formed on the bottom wall 47C. The opening peripheral edge part of the first valve connecting hole 47Cb is the second seat surface 47Cc, and the first valve connecting hole 47Cb is opened and closed by attaching and detaching of the second valve unit 50C.

The second valve unit 50 is equipped with the bottom wall 51C and the side wall 52C, and is formed in a cup shape having a storage part 50C-S that opens at the top part, and is energized in the valve closing direction by a spring 54C. A flat valve part 51Ca is formed on the bottom wall 51C. The valve part 51Ca opens and closes the first valve connecting hole 47Cb by attaching and detaching with the second seat surface 47Cc of the first valve connecting hole 47Cb of the first valve unit 41C. Also, a third valve connecting hole 51Cb that is connected to the first valve connecting hole 47Cb is formed at the center part of the valve part 51Ca. The opening peripheral edge part of the third valve connecting hole 51Cb is the third seat surface 51Cc, and the third valve connecting hole 51Cb is opened and closed by attaching and detaching of the third valve unit 60C. On the bottom wall 51C, the top surface is the slanted surface 51Cd that slants toward the center. The ribs 52Ca are formed on the wall surface of the storage part 50C-S side of the side wall 52C, and between those are paths. The spring 54C is extended between the bottom wall 51C and the first valve unit 41 valve part 42, and energizes in the valve closing direction.

Also, the shielding member 70C which is the top part of the second valve chamber forming member 35C is formed as an integral unit on the opening peripheral edge part of the second communication path 37P-C. The shielding member 70C is equipped with a generally disk shaped shielding part 71C and a plurality of leg parts 72C provided projecting from the bottom part outer periphery of the shielding part 71C, and a detour 73C is formed between the leg parts 72C. With the detour 73C, the flow of the air flow is faced toward the side direction by contacting the shielding part 71C to avoid application of a large force in the valve opening direction on the second valve unit 50C and the third valve unit 60C due to the air flow from the second communication path 37P-C.

Figure 14:
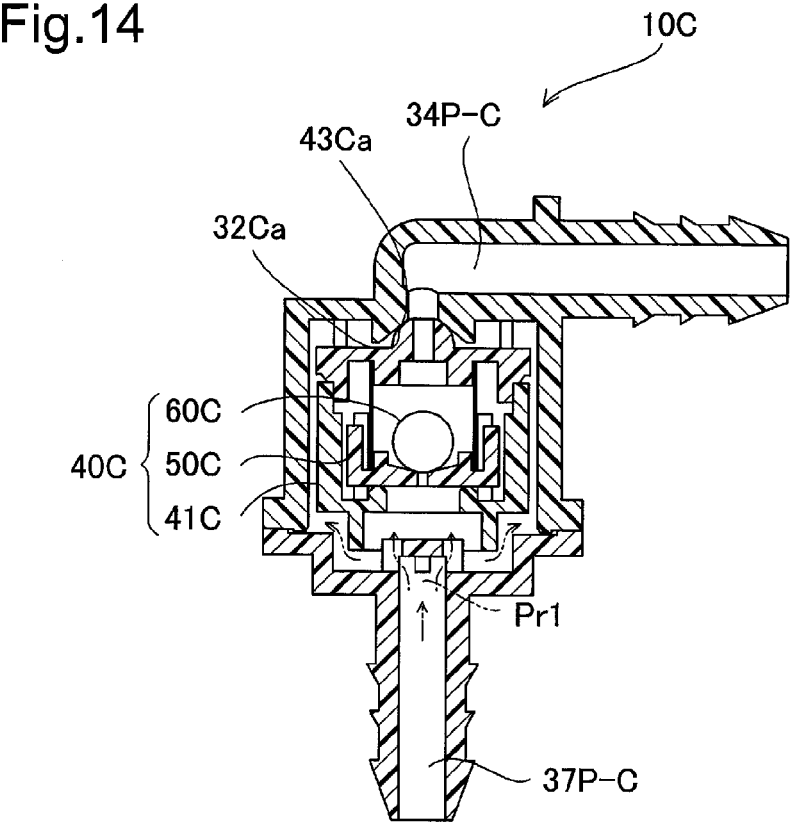
FIG. 14 shows the operation of the fuel tank valve device.

We will describe the operation of the fuel tank valve device 10C. In FIG. 11, the fuel tank valve device 10C receives the tank internal pressure at the pressure receiving surface of the second communication path 37P and the first valve unit 41C. Then, as shown in FIG. 14, when the upward (valve closing direction) force applied to the valve mechanism 40C becomes greater than the self weight of the first valve unit 41C, the second valve unit 50C, and the third valve unit 60C, these become an integral unit and move upward, and the seat surface 43Ca is seated on the seal part 32Ca and closes the first communication path 34P-C. By doing this, the tank internal pressure is maintained by the fuel tank valve device 10C.

Figure 15:
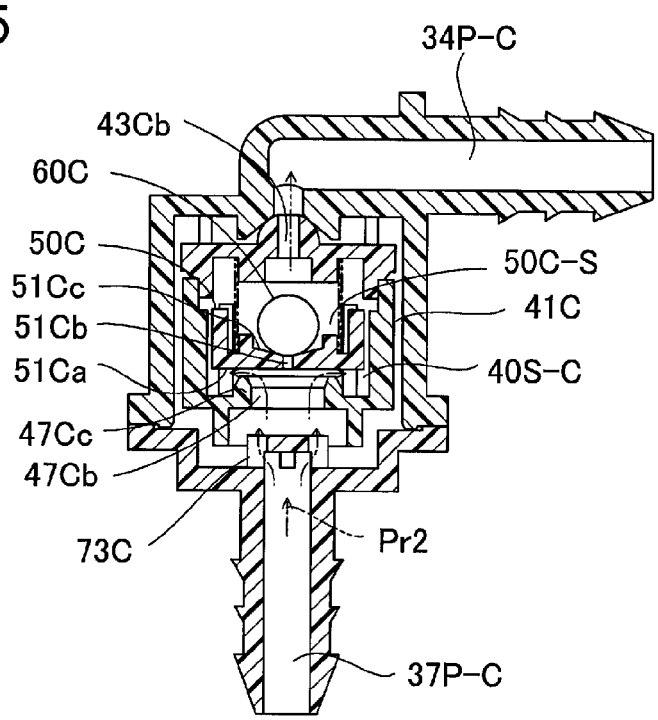
FIG. 15 shows the operation subsequent to FIG. 14.

Then, as shown in FIG. 15, when the tank internal pressure exceeds the preset second pressure value Pr2, the valve part 51Ca of the second valve unit 50C separates from the second seat surface 47Cc of the first valve unit 41C, opening the first valve connecting hole 47Cb. By doing this, the air flow from the second communication path 37P-C flows through the detour 73C, the first valve connecting hole 47Cb, the storage chamber 40S-C, the second valve connecting hole 43Cb, and the first communication path 34P-C, and the tank internal pressure is allowed to escape to the canister CN (see FIG. 1), suppressing a rapid rise, and it is possible to prevent blowing back or the like from the inlet pipe IP (see FIG. 1). Note that when a pressure greater than that valve opening pressure is applied to the third valve unit 60C through the third valve connecting hole 51Cb, the third valve unit 60C separates from the third seat surface 51Cc and moves upward to open the valve. By doing this, the air flow from the second communication path 37P-C also flows through the second valve connecting hole 43Cb from the third valve connecting hole 51Cb and the storage part 50C-S, and it is possible to further suppress the tank internal pressure.

Figure 16:
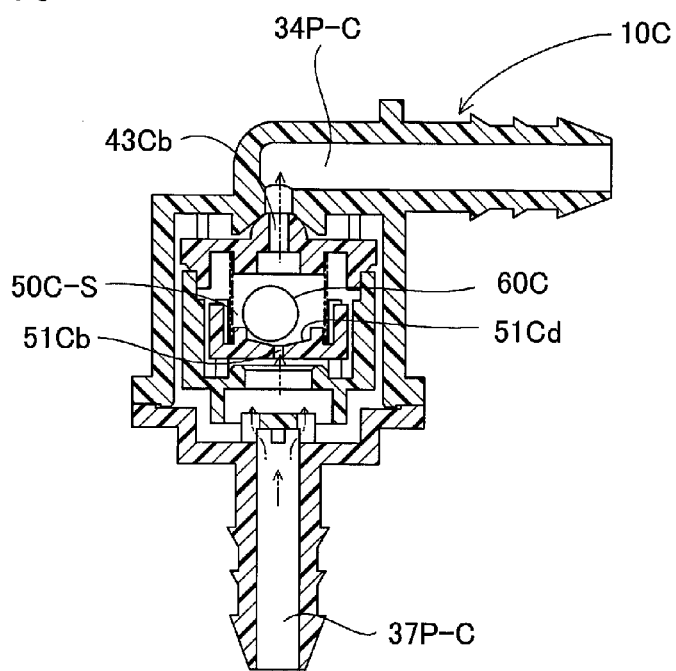
FIG. 16 shows the operation subsequent to FIG. 15.

Furthermore, when fueling ends and the vehicle runs, as shown in FIG. 16, the third valve unit 60C moves over the slanted surface 51Cd, and when the third valve connecting hole 51Cb opens, the air flow flows from the third valve connecting hole 51Cb through the storage part 50C-S and the second valve connecting hole 43Cb, and the tank internal pressure is allowed to escape.

As shown in FIG. 11, with the fuel tank valve device 10C of the third embodiment, the valve part 51Ca of the second valve unit 50C is a flat plane that sits on the second seat surface 47Cc, so the angle dependence of the fuel tank valve device 10c is low. Also, the first valve connecting hole 47Cb is opened and closed by the flat valve part 51Ca, so compared to the second valve unit 50 using the ball valve of the first embodiment, it is possible to set to a larger area. Thus, it is possible to flow a large air flow volume and it is possible to suppress a rapid rise in the tank internal pressure.

D. Fourth Embodiment

Figure 17:
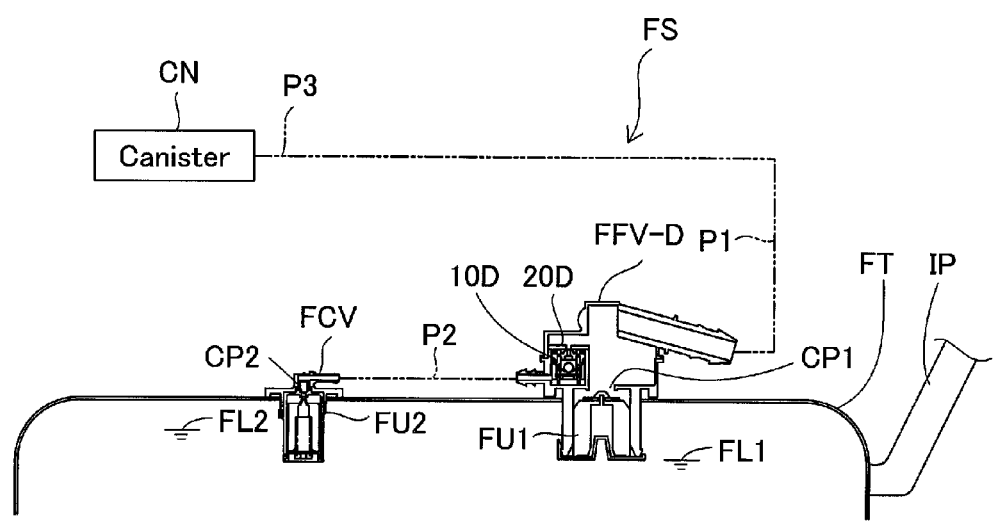
FIG. 17 shows the fuel tank ventilation device in which the fuel tank valve device of the fourth embodiment is mounted.
Figure 18:
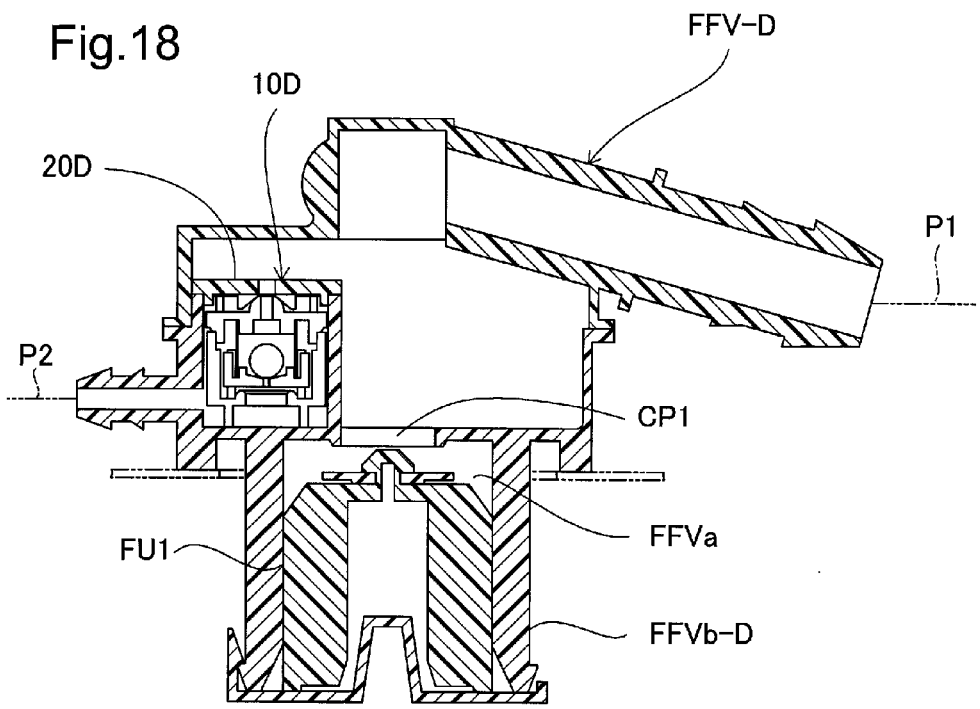
FIG. 18 is a cross section view showing the state with the fuel tank valve device assembled on the full tank control valve.

FIG. 17 is an explanatory drawing that explains the fuel tank ventilation device on which the fuel tank valve device of the fourth embodiment is mounted. This embodiment has its characteristic feature in the constitution for which the fuel tank valve device 10D is assembled as in integral unit with the full tank control valve FFV-D (first fuel cutoff valve). FIG. 18 is a cross section view showing with the vicinity of the full tank control valve FFV-D enlarged. The fuel tank valve device 10D is assembled as an integral unit with the casing FFVb-E of the full tank control valve FFV-D. As shown in FIG. 17, the fuel tank valve device 10D is connected to the rollover valve FCV via the second piping P2, and connected to the canister CN via the first piping P1. With this embodiment, it is possible to simplify the attachment constitution of the fuel tank valve device 10D, and to simplify the piping for connecting the fuel tank valve device 10D to the full tank control valve FFV-D.

E. Fifth Embodiment

Figure 19:
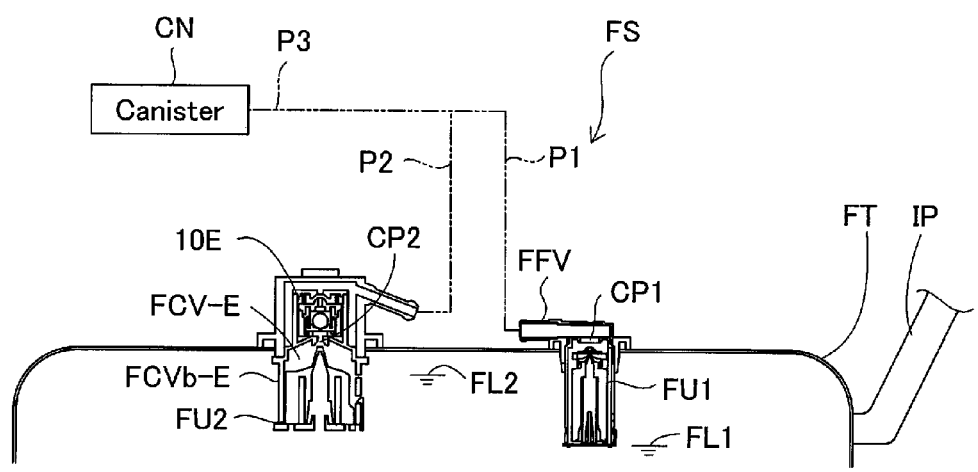
FIG. 19 shows the fuel tank ventilation device in which the fuel tank valve device of the fifth embodiment is mounted.
Figure 20:
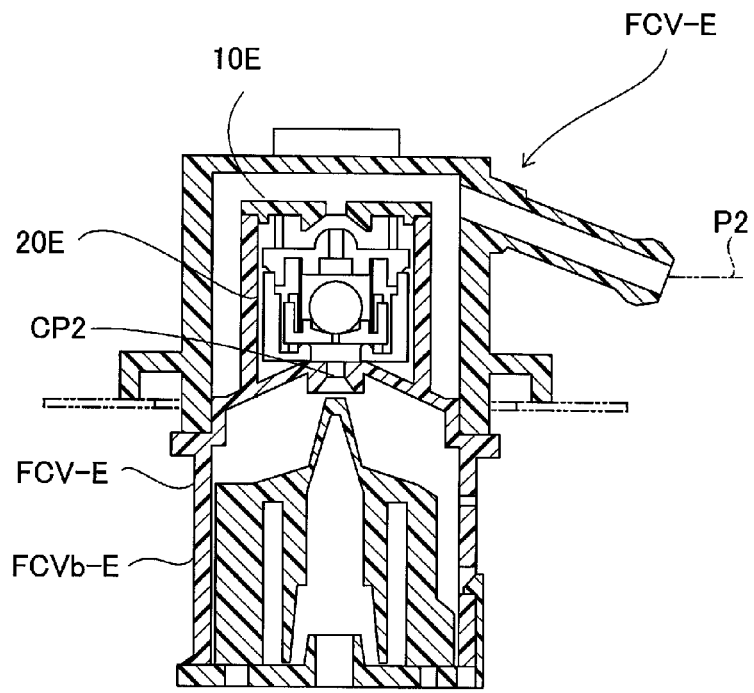
FIG. 20 is a cross section view showing the state with the fuel tank valve device assembled on the rollover valve.

FIG. 19 is an explanatory drawing that explains the fuel tank ventilation device on which the fuel tank valve device of the fifth embodiment is mounted. This embodiment has its characteristic feature in the constitution of the assembly of the fuel tank valve device 10E as an integral unit with the rollover valve FCV-E (second fuel cutoff valve). FIG. 20 is a cross section view of the vicinity of the rollover valve FCV-E enlarged. The fuel tank valve device 10E is assembled as an integral unit in the space of the top part of the second casing FCVb-E of the rollover valve FCV-E. The fuel tank valve device 10E is connected to the second connecting path CP2 of the rollover valve FCV-E and is also connected to the canister CN (FIG. 19) via the second piping P2. With this embodiment as well, the same as with the fourth embodiment, it is possible to simplify the attachment constitution of the fuel tank valve device 10E, and to simplify the piping for connecting the fuel tank valve device 10E to the rollover valve FCV-E.

F. Sixth Embodiment

Figure 21:
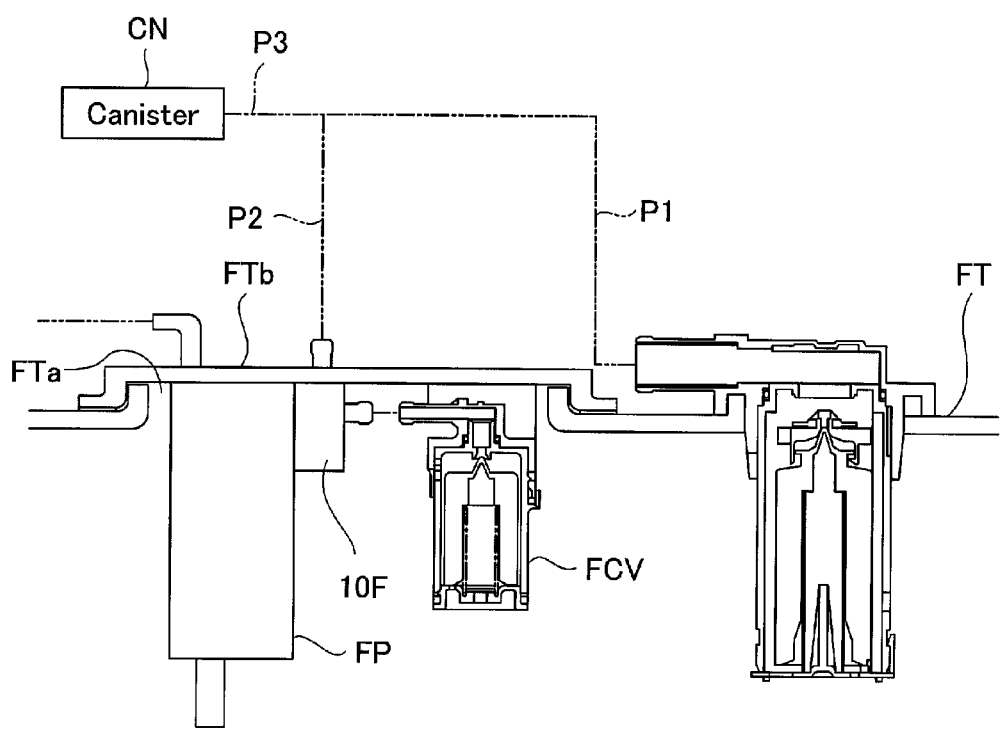
FIG. 21 shows the fuel tank ventilation device of the sixth embodiment.

FIG. 21 is an explanatory drawing explaining the fuel tank ventilation device of the sixth embodiment. This embodiment has its characteristic feature in the constitution of the fuel tank valve device 10F being an integral unit with the fuel pump FP. Specifically, a tank opening FTa is formed at the upper wall of the fuel tank FT, and this tank opening FTa is plugged by the lid unit FTb. On the lid unit FTb are mounted the fuel pump FP, the fuel tank valve device 10F, and the rollover valve FCV. The fuel tank valve device 10F is assembled as an integral unit on the fuel pump FP. With this embodiment, by making the fuel tank valve device 10F or the like an integral unit with the fuel pump FP, in other words by modulizing, the constitution becomes simple, and the attachment work becomes easier.

Note that this invention is not limited to the embodiments noted above, and can be implemented in various modes within a scope that does not stray from its gist, and the following variations are possible, for example.

With this embodiment, as the second valve unit, a ball valve and cup shaped valve unit were used, bit this is not limited to these, and it is also possible to use a plate formed from a metal thin plate or a poppet valve.

The first and second valve units of the embodiments noted above were constituted so as to be opened and closed by pressure and balancing with their own weight, but this is not limited to this, and it is also possible to supplementarily use a spring to energize in the valve closing or valve opening direction.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A fuel tank valve device that communicates and shuts off a path between an interior of a fuel tank and outside, the fuel tank valve device comprising:
    a casing that includes (i) a first communication path connected to the outside, (ii) a second communication path connected to the fuel tank, and (iii) a valve chamber that forms a valve flow path that connects the first communication path and the second communication path, and
    a valve mechanism that is held in the valve chamber, and opens and closes the valve flow path according to pressure of the first communication path and the second communication path,
    wherein the valve mechanism includes
    a first valve unit that has (i) a pressure receiving surface that receives pressure from the first and second communication path, wherein an area of the pressure receiving surface is larger than a close sectional area of the first communication path, and (ii) a first valve connecting hole that forms a part of the valve flow path, and
    a second valve unit that opens and closes the first valve connecting hole,
    wherein the first valve unit is configured to close the valve flow path when the pressure of the second communication path exceeds a preset first pressure value, and
    the second valve unit is configured to open the first valve connecting hole when (i) the first valve unit closes the valve flow path, and (ii) the pressure of the second communication path exceeds a preset second pressure value that is greater than the first pressure value, thereby the valve flow path being opened through the first valve connecting hole.

2. A fuel tank ventilation device that comprises the fuel tank valve device of claim 1, and a first and second fuel cutoff valves, wherein
    the first fuel cutoff valve includes;
    a first casing that has a first connecting path connected to outside of the fuel tank, and a first valve chamber for connecting the first connecting path and the fuel tank interior, and
    a first float mechanism that is held in the first valve chamber and closes the first connecting path by rising when the fuel fluid level of the fuel tank exceeds a first fluid level, and
    the second fuel cutoff valve includes;
    a second casing that has a second connecting path connected to the second communication path of the fuel tank valve device, and a second valve chamber for connecting the second connecting path and the fuel tank interior, wherein a close sectional area of the second connecting path is smaller than that of the first connecting path, and
    a second float mechanism that is held in the second valve chamber and closes the second connecting path by rising when the fuel fluid level of the fluid tank exceeds a second fluid level higher than the first fluid level.

3. The fuel tank ventilation device in accordance with claim 2, wherein
    the first casing of the first fuel cutoff valve and the casing of the fuel tank valve device are assembled as an integral unit.

4. The fuel tank ventilation device in accordance with claim 2, wherein
    the second casing of the second fuel cutoff valve and the casing of the fuel tank valve device are assembled as an integral unit.

5. The fuel tank valve device in accordance with claim 1, wherein
    the first valve unit comprises: a valve part and a cup shaped support part, wherein
    the valve part includes (i) a seat surface that opens and closes the valve flow path by seating on an opening peripheral edge part of the first communication path, and (ii) a second valve connecting hole that pierces through the seat surface and is connected to the first communication path, and
    the support part is mounted on the valve part to form a storage chamber together with the valve part, and includes (i) a bottom wall that has the first valve connecting hole and (ii) a side wall provided projecting in a cylinder shape from an outer periphery of the bottom wall, and
    the second valve unit is held in the storage chamber to open and close the first valve connecting hole, and is configured such that the valve flow path includes (i) a first flow path that is formed between the first valve unit and an inner wall of the casing, and is opened and closed by the seat surface, and (ii) a second valve flow path that is formed together the first valve connecting hole, the storage chamber, and the second valve connecting hole, and is opened and closed by the second valve unit.

6. The fuel tank valve device in accordance with claim 5, wherein
the casing comprises guide projections that guide the movement of the first valve unit along an inner wall forming the valve chamber, and form a part of the first valve flow path.

7. The fuel tank valve device in accordance with claim 5, wherein
the first valve unit has ribs that form a part of the second valve flow path by projecting from an inner wall forming the storage chamber.

8. The fuel tank valve device in accordance with claim 5, wherein
the second valve unit is a ball valve, and
the bottom wall of the support part comprises a slanted surface, wherein the slanted surface is formed such that the second valve unit is supported to move toward the first valve connecting hole by gravity thereof.

9. The fuel tank valve device in accordance with claim 5, further comprising a shielding member that is disposed between the second communication path and the first valve connecting hole, for forming a detour, wherein the detour is configured such that the fluid flowing from the second communication path to the first valve connecting hole flows to avoid direct contact with the second valve unit.

10. A fuel tank ventilation device that comprises the fuel tank valve device of claim 5, and a first and second fuel cutoff valves, wherein
the first fuel cutoff valve includes;
a first casing that has a first connecting path connected to outside of the fuel tank, and a first valve chamber for connecting the first connecting path and the fuel tank interior, and
a first float mechanism that is held in the first valve chamber and closes the first connecting path by rising when the fuel fluid level of the fuel tank exceeds a first fluid level, and
the second fuel cutoff valve includes;
a second casing that has a second connecting path connected to the second communication path of the fuel tank valve device, and a second valve chamber for connecting the second connecting path and the fuel tank interior, wherein a close sectional area of the second connecting path is smaller than that of the first connecting path, and
a second float mechanism that is held in the second valve chamber and closes the second connecting path by rising when the fuel fluid level of the fluid tank exceeds a second fluid level higher than the first fluid level.

11. The fuel tank valve device in accordance with claim 5, wherein
the second valve unit is slidably held in the storage chamber, and includes a bottom wall and a side wall projecting in a cylinder shape from an outer periphery of the bottom wall, wherein the bottom wall and the side wall form a cup-shaped storage part, and
the bottom wall of the second valve unit includes a valve part that opens and closes the first valve connecting hole.

12. The fuel tank valve device in accordance with claim 11, wherein
the side wall of the second valve unit has ribs that form a part of the second valve flow path by projecting from an wall surface forming the storage part.

13. The fuel tank valve device in accordance with claim 11, wherein
the valve mechanism comprises a third valve unit that has a ball valve held in the storage part, and
the bottom wall of the second valve unit comprises (i) a third valve connecting hole that connects the first valve connecting hole and the storage part, and (ii) a slanted surface to be formed such that the third valve unit is supported to move toward the third valve connecting hole by gravity thereof.

14. The fuel tank valve device in accordance with claim 11, further comprising a shielding member that is disposed between the second communication path and the first valve connecting hole, for forming a detour, wherein the detour is configured such that the fluid flowing from the second communication path to the first valve connecting hole flows to avoid direct contact with the second valve unit.

15. The fuel tank valve device in accordance with claim 14, further comprising a shielding member that is disposed between the second communication path and the first valve connecting hole, for forming a detour, wherein the detour is configured such that the fluid flowing from the second communication path to the first valve connecting hole flows to avoid direct contact with the second valve unit.

16. A fuel tank ventilation device that comprises the fuel tank valve device of claim 11, and a first and second fuel cutoff valves, wherein
the first fuel cutoff valve includes;
a first casing that has a first connecting path connected to outside of the fuel tank, and a first valve chamber for connecting the first connecting path and the fuel tank interior, and
a first float mechanism that is held in the first valve chamber and closes the first connecting path by rising when the fuel fluid level of the fuel tank exceeds a first fluid level, and
the second fuel cutoff valve includes;
a second casing that has a second connecting path connected to the second communication path of the fuel tank valve device, and a second valve chamber for connecting the second connecting path and the fuel tank interior, wherein a close sectional area of the second connecting path is smaller than that of the first connecting path, and
a second float mechanism that is held in the second valve chamber and closes the second connecting path by rising when the fuel fluid level of the fluid tank exceeds a second fluid level higher than the first fluid level.

17. The fuel tank ventilation device in accordance with claim 16, wherein
the first casing of the first fuel cutoff valve and the casing of the fuel tank valve device are assembled as an integral unit.

18. A fuel tank ventilation device in accordance with claim 16, wherein
the second casing of the second fuel cutoff valve and the casing of the fuel tank valve device are assembled as an integral unit.

19. The fuel tank ventilation device in accordance with claim 16, wherein
the first casing of the first fuel cutoff valve and the casing of the fuel tank valve device are assembled as an integral unit.

20. The fuel tank ventilation device in accordance with claim 16, wherein
the second casing of the second fuel cutoff valve and the casing of the fuel tank valve device are assembled as an integral unit.

* * * * *